United States Patent
Hamai et al.

(10) Patent No.: US 9,758,409 B2
(45) Date of Patent: Sep. 12, 2017

(54) BIOLOGICAL PURIFIER FOR UNTREATED WASTE WATER AND METHOD OF PRODUCING THE SAME, BIOLOGICAL PURIFICATION METHOD FOR UNTREATED WASTE WATER, AND BIOLOGICAL PURIFICATION SYSTEM FOR UNTREATED WASTE WATER

(71) Applicant: Japan Oil, Gas and Metals National Corporation, Minato-ku, Tokyo (JP)

(72) Inventors: Takaya Hamai, Tokyo (JP); Takuya Kodera, Tokyo (JP); Hisatoshi Furuya, Tokyo (JP)

(73) Assignee: Japan Oil, Gas and Metals National Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/912,209

(22) PCT Filed: Jul. 24, 2014

(86) PCT No.: PCT/JP2014/003910
§ 371 (c)(1),
(2) Date: Feb. 16, 2016

(87) PCT Pub. No.: WO2015/029326
PCT Pub. Date: Mar. 5, 2015

(65) Prior Publication Data
US 2016/0194228 A1    Jul. 7, 2016

(30) Foreign Application Priority Data
Aug. 30, 2013    (JP) ................................ 2013-180148

(51) Int. Cl.
*C02F 3/28*    (2006.01)
*C02F 3/34*    (2006.01)
(Continued)

(52) U.S. Cl.
CPC .......... *C02F 3/2813* (2013.01); *C02F 3/2826* (2013.01); *C02F 3/345* (2013.01);
(Continued)

(58) Field of Classification Search
CPC .... C02F 3/345; C02F 2101/20; C02F 3/2806; C02F 3/2813; C02F 3/2826
(Continued)

(56) References Cited

U.S. PATENT DOCUMENTS 6,679,992 B1 *   1/2004   Kitagawa ................ B09C 1/002
                                                   210/170.07
8,366,932 B1 *   2/2013   Sung ....................... C02F 3/006
                                                   210/603
(Continued)

FOREIGN PATENT DOCUMENTS

| JP | H08-66698 A | 3/1996 |
| WO | 2012/081715 A1 | 6/2012 |
| WO | WO2012081715 * | 6/2012 |

OTHER PUBLICATIONS

Aug. 19, 2014, International Search Report issued in International Patent Application No. PCT/JP2014/003910.
(Continued)

*Primary Examiner* — Claire Norris
(74) *Attorney, Agent, or Firm* — Kenja IP Law PC

(57) ABSTRACT

Provided is a biological purifier, by which metal ions in untreated waste water containing the metal ions and sulfate ions can be removed in a low temperature environment with a water temperature of 15° C. or less for a long period of time. The biological purifier for untreated waste water containing metal ions and sulfate ions used for removing the metal ions from the untreated waste water by precipitating sulfides of the metal ions, the biological purifier includes chaff retaining sulfate-reducing bacteria; and an organic-containing material containing 5 mass % or more of crude protein.

9 Claims, 14 Drawing Sheets

(51) Int. Cl.
 *C02F 101/10* (2006.01)
 *C02F 101/20* (2006.01)
 *C02F 103/10* (2006.01)

(52) U.S. Cl.
 CPC .... *C02F 2101/101* (2013.01); *C02F 2101/20* (2013.01); *C02F 2103/10* (2013.01)

(58) Field of Classification Search
 USPC .................................................. 210/610, 912
 See application file for complete search history.

(56) References Cited

U.S. PATENT DOCUMENTS

| | | | |
|---|---|---|---|
| 2009/0001002 A1* | 1/2009 | Bauer | C02F 3/046 210/138 |
| 2013/0180916 A1* | 7/2013 | Furuya | C02F 3/345 210/616 |

OTHER PUBLICATIONS

Naotoshi Furuya, "Passive Treatment Gijutsu o Mochiita Kohaisui Shori ni Kakaru Kenkyu Jirei", Journal of MMIJ, May 25, 2010, vol. 126, No. 6, pp. 232 to 233.

Evvie Chockalingam, Chemosphere, Feb. 2006, vol. 62 No. 5, p. 699-708.

* cited by examiner

FIG. 13
(A)
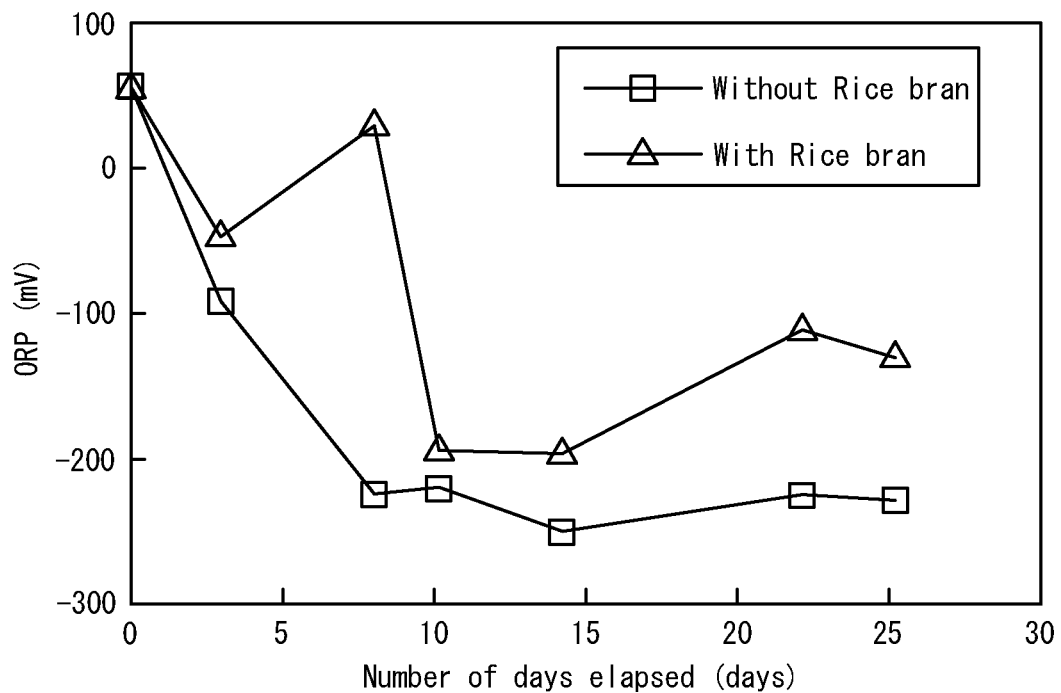
(B)
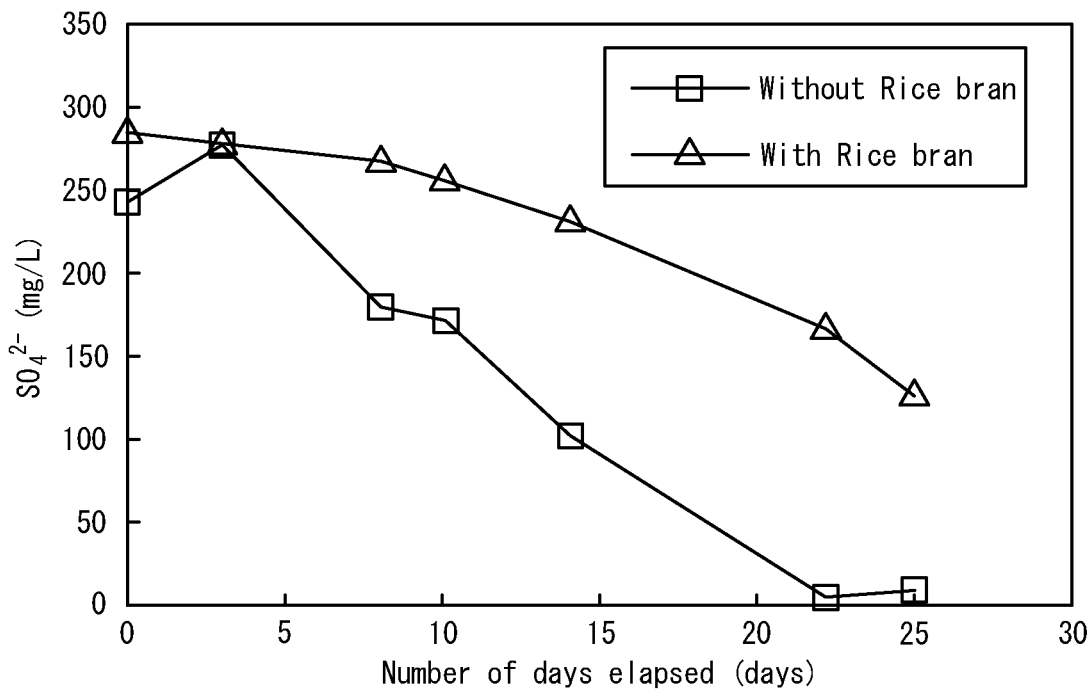

BIOLOGICAL PURIFIER FOR UNTREATED WASTE WATER AND METHOD OF PRODUCING THE SAME, BIOLOGICAL PURIFICATION METHOD FOR UNTREATED WASTE WATER, AND BIOLOGICAL PURIFICATION SYSTEM FOR UNTREATED WASTE WATER

TECHNICAL FIELD

The present disclosure relates to a biological purifier for removing metal ions from the untreated waste water containing the metal ions and sulfate ions by precipitating sulfides of the metal ions, a method of producing the same, a biological purification method for the untreated waste water, and a biological purification system for the untreated waste water.

BACKGROUND

Various types of wastewaters, for example, wastewater generated by mining operations such as drainage from metal mines, and industrial wastewater contain various types of metal ions. Many of metal ions have harmful effects on human bodies or the environment. Therefore, water containing such metal ions must be treated to meet effluent standards prescribed by each country, before being discharged.

Further, recently, some countries and areas are likely to make effluent standards stricter than at present thereby reducing environmental pollution. Accordingly, there are pressing needs for developing techniques for minimizing the concentration of metal ions contained in untreated waste water at low cost.

Various types of wastewaters such as mine drainage or industrial wastewater generally contain ions of metals such as Fe, Zn, Cu, Pb, Cd, and As, and may further contain about 50-3000 mg/L of sulfate ions ($SO_4^{2-}$). In view of the above, in recent years, techniques using the action of sulfate-reducing bacteria to remove metal ions from untreated waste water containing sulfate ions have been studied. With such techniques, sulfate ions are reduced by sulfate-reducing bacteria to generate sulfide ions, and by reaction of the sulfide ions with the metal ions, sulfides of the metals are produced and precipitated; thus, the metal ions are removed from the untreated waste water.

In order to sufficiently develop the reaction, the sulfate-reducing bacteria need to be activated. In WO 12/081715 A (PTL 1), the applicant demonstrated that suitable organic-containing materials are required to be selected as organic-containing materials for imparting organic matter that serves as respiratory substrates for the sulfate-reducing bacteria, since a variety of known organic-containing materials include ones that can cause the effects of the sulfate-reducing bacteria and ones that cannot cause the effects of the sulfate-reducing bacteria in practice. Further, the applicant demonstrated that when chaff, which is a biomass resource available at little cost, is used as the organic-containing material, metal ions in untreated waste water can be removed for a long period of time.

CITATION LIST

Patent Literature

PTL 1: WO 12/081715 A

SUMMARY

Technical Problem

In PTL 1, the acclimation of sulfate-reducing bacteria is performed at a water temperature of 30° C., and in the subsequent step for removing metal ions by continuously flowing the untreated waste water, the water temperature is assumed to be 25° C. or more. Here, many mines are in areas where the temperature is lower in winter and mine drainage effluent from such mines is assumed to have a water temperature of 15° C. or less even if geothermal heat or heat from mine water is used. However, as the inventors of the present invention made further studies to find that the biological purifier containing chaff retaining sulfate-reducing bacteria, described in PTL 1 has the metal ion removal effect only for a short period of time when the water temperature is low.

In view of the above problems, it could be helpful to provide a biological purifier that makes it possible to remove metal ions in untreated waste water containing metal ions and sulfate ions in a low temperature environment with a water temperature of 15° C. or less for a long period of time; a biological purification method; and a biological purification system. It could also be helpful to provide a preferred method of producing the biological purifier.

Solution to Problem

In order to achieve the objectives, the inventors made various studies focusing on the type of the organic-containing materials for imparting organic matter serving as respiratory substrates for sulfate-reducing bacteria. As a result, they found that in the low temperature environment with a water temperature of 15° C. or less, sulfate-reducing bacteria are sufficiently activated when an organic-containing material containing 5 mass % or more of crude protein in addition to chaff is used as an organic-containing material. The chaff not only serves as organic matter serving as respiratory substrates for sulfate-reducing bacteria by partly being decomposed but also serves to carry a bacterial community including sulfate-reducing bacteria, which is involved in the sulfate ion-reducing activity. Accordingly, the chaff is essential in the disclosed technique, and the chaff can sustain the metal ion-removal effect for a long period of time in the low temperature environment only when an organic-containing material containing 5 mass % or more of crude protein is added thereto.

Based on the above findings, we provide the following features.

(1) A biological purifier for untreated waste water containing metal ions and sulfate ions used for removing the metal ions from the untreated waste water by precipitating sulfides of the metal ions, the biological purifier comprising:
chaff retaining sulfate-reducing bacteria; and
an organic-containing material containing 5 mass % or more of crude protein.

(2) The biological purifier for untreated waste water, according to (1) above, wherein the organic-containing material contains 50 mass % or less of crude fiber.

(3) The biological purifier for untreated waste water, according to (1) or (2) above, wherein the chaff is left with the untreated waste water under anaerobic conditions so that a bacterial community including the sulfate-reducing bacteria, involved in the sulfate ion-reducing activity is acclimated, and the organic-containing material is added after the acclimation.

(4) The biological purifier for untreated waste water, according to any one of claims 1 to 3, wherein the organic-containing material is made of at least one selected from sake lees, bean curd refuse, rice bran, tea leaves, Lotus, timothy, and clover.

(5) The biological purifier for untreated waste water, according to any one of claims 1 to 3, wherein the organic-containing material is made of at least one selected from sake lees, bean curd refuse, and rice bran.

(6) A biological purification method for removing metal ions from untreated waste water containing the metal ions and sulfate ions, the method comprising the steps of:

providing a biological purifier comprising chaff retaining sulfate-reducing bacteria and an organic-containing material containing 5 mass % or more of crude protein, continuously flowing the untreated waste water through the biological purifier under anaerobic conditions, and thereby precipitating sulfides of the metal ions to remove the metal ions from the untreated waste water.

(7) The biological purification method for untreated waste water, according to (6) above, further comprising the steps of:

acclimating a bacterial community including the sulfate-reducing bacteria, involved in the sulfate ion-reducing activity by leaving the chaff with the untreated waste water under anaerobic conditions, and then adding the organic-containing material, followed by the continuous water flowing step.

(8) The biological purification method for untreated waste water, according to (7) above, wherein the acclimation step comprises:

a pre-cultivation step of culturing the bacterial community including the sulfate-reducing bacteria, involved in the sulfate ion-reducing activity by leaving part of the chaff with bacterial sources and the untreated waste water under anaerobic conditions at a water temperature of 20° C. to 30° C.; and a subsequent cultivation step of further culturing the bacterial community including the sulfate-reducing bacteria, involved in the sulfate ion-reducing activity by leaving the pre-cultivated chaff with the rest of the chaff and the untreated waste water under anaerobic conditions at a water temperature of 10° C. to 15° C.

(9) A biological purification system for untreated waste water containing metal ions and sulfate ions configured to remove the metal ions from the untreated waste water, the system comprising:

a treatment container storing a biological purifier comprising chaff retaining sulfate-reducing bacteria and an organic-containing material containing 5 mass % or more of crude protein, in which container, anaerobic conditions are maintained;

a supply circuit continuously supplying the untreated waste water into the treatment container; and a discharge circuit continuously discharging treated water, from which the metal ions have been removed by precipitating sulfides of the metal ions in the treatment container by the biological purifier, from the treatment container.

(10) A method of producing a biological purifier for untreated waste water containing metal ions and sulfate ions used for removing the metal ions from the untreated waste water by precipitating sulfides of the metal ions, the method comprising the steps of:

acclimating a bacterial community including sulfate-reducing bacteria, involved in the sulfate ion-reducing activity by leaving chaff retaining the sulfate-reducing bacteria with the untreated waste water under anaerobic conditions; and then adding an organic-containing material containing 5 mass % or more of crude protein to obtain the biological purifier.

(11) The method of producing a biological purifier for untreated waste water, according to (10) above, wherein the acclimation step comprises:

a pre-cultivation step of culturing the bacterial community including the sulfate-reducing bacteria, involved in the sulfate ion-reducing activity by leaving part of the chaff with bacterial sources and the untreated waste water under anaerobic conditions at a water temperature of 20° C. to 30° C.; and a subsequent cultivation step of further culturing the bacterial community including the sulfate-reducing bacteria, involved in the sulfate ion-reducing activity by leaving the pre-cultivated chaff with the rest of the chaff and the untreated waste water under anaerobic conditions at a water temperature of 10° C. to 15° C.

Advantageous Effect

In accordance with the disclosed biological purifier, biological purification method, and biological purification system, metal ions in untreated waste water containing metal ions and sulfate ions can be removed in a low temperature environment with a water temperature of 15° C. or less for a long period of time. Further, in accordance with the disclosed production method, a biological purifier as described above can be obtained in a preferred manner.

BRIEF DESCRIPTION OF THE DRAWINGS

In the accompanying drawings:

FIGS. 13(A) and 13(B) are graphs for comparing the cases where rice bran is added and where not when sulfate-reducing bacteria retained by rice husks are cultured (water temperature: 15° C.), in which FIG. 13(A) is a graph showing the change in the ORP with time, whereas FIG. 13(B) is a graph showing the change in the sulfate ion concentration with time.

DETAILED DESCRIPTION

Figure 1:
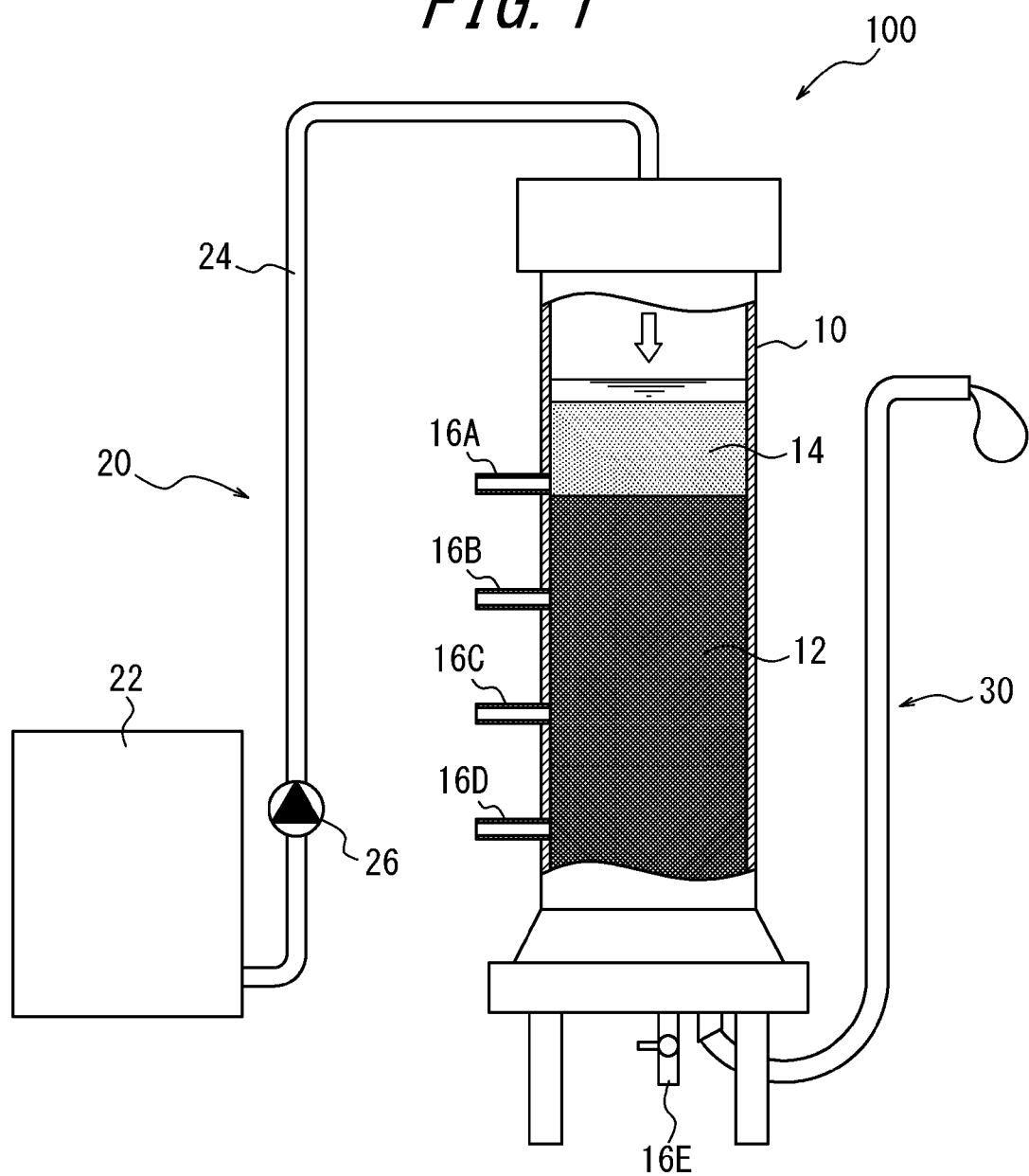
FIG. 1 is a schematic view of a biological purification system according to one embodiment.

Embodiments of will be described below with reference to the drawings to describe this disclosure in more detail with the operation and effect.

(Biological Purifier for Untreated Waste Water)

The disclosed biological purifier is used to remove metal ions from untreated waste water containing the metal ions and sulfate ions by precipitating sulfides of the metal ions. Untreated waste water involved in this disclosure is not limited as long as it contains metal ions and sulfate ions; the water may be, for example, wastewater generated by mining operations such as drainage from metal mines, industrial wastewater, and the like. Drainage from metal mines in our country (Japan) typically contains, for example, ions of heavy metals such as Fe, Zn, Cu, Pb, Cd, and As, and further contains about 50 mg/L to 3000 mg/L of sulfate ions ($SO_4^{2-}$). Note that "untreated waste water" herein means water before being treated by purification using a biological purifier, that is, removal of metal ions. Meanwhile, "treated water" means water having been treated by the purification. The pH of untreated waste water is typically about 3.0 to 8.0.

Sulfate-reducing bacteria (SRB) are heterotrophic bacteria taking an active part using organic matter as respiratory substrates in the presence of sulfate ions, and they function to reduce sulfate ions as shown in Formula (1) below. Specifically, sulfate-reducing bacteria take up organic matter and sulfate ions, and release hydrogen sulfide ions.

$$2CH_2O + SO_4^{2-} = 2HCO_3^- + HS^- + H^+ \quad (1),$$

where $CH_2O$ is organic matter.

Sulfate-reducing bacteria are anaerobic bacteria primarily taking an active part in the neutral range (pH: 5 to 8), which take an active part using organic matter as respiratory substrates, and reduces sulfate ions. Although not limited thereto, they may be, for example, *Desulfovibrio vulgaris*, and the like. In actual tests, *Desulfovibrio magneticus, Desulfarrculus baariss, Desulfotomaculum acetoxidans, Desulfobulbus propionicus*, and the like have been detected.

As the reduction reaction in Formula (1) above (reaction in Formula (1) to the right) proceeds, hydrogen sulfide ions ($HS^-$) are generated, and the generated hydrogen sulfide ions ($HS^-$) are chemically combined with heavy metal ions in untreated waste water. Thus, sulfides of metal ions are precipitated by the reaction of Formula (2) shown below, so that the metal ions are removed from the untreated waste water.

$$Me^{2+} + HS^- = MeS\downarrow + H^+ \quad (2),$$

where Me is a metal.

The disclosed biological purifier contains chaff retaining sulfate-reducing bacteria and an organic-containing material including 5 mass % or more of crude protein. This biological purifier makes it possible to achieving a sufficient reduction reaction of sulfate ions as in Formula (1) above thereby obtaining the effect in precipitating sulfides of metal ions by the reaction of Formula 2 for a long period of time even when the water temperature of the untreated waste water is low as 15° C. or less.

Chaff has a suitable shape for carrying a bacterial community including sulfate-reducing bacteria, involved in the sulfate ion-reducing activity. Accordingly, chaff not only serves as organic matter (low-molecular-weight organic matter) serving as respiratory substrates for sulfate-reducing bacteria by partly being decomposed but also serves to carry a bacterial community including sulfate-reducing bacteria, which is involved in the sulfate ion-reducing activity. The chaff may be rice husks, buckwheat husks, and the like. Such bacterial communities including sulfate-reducing bacteria, involved in the sulfate ion-reducing activity are generally attached by nature to chaff collected from the nature. The chaff may be one that has not been subjected to any treatment. Obviously, a bacterial community including sulfate-reducing bacteria, involved in the sulfate ion-reducing activity may further be added to the collected chaff.

Chaff is a biomass resource which is wasted in normal situations, and they are readily available in large quantities at little cost. Further, chaff is granular in shape, easy to handle because it does not require processes such as cutting or crushing, and relatively uniform in quality.

Importantly, a biological purifier of this embodiment contains an organic-containing material containing 5 mass % or more of crude protein in addition to chaff. Various kinds of bacteria in the biological purifier decompose crude protein in the organic-containing material into organic components that can be used as respiratory substrates by sulfate-reducing bacteria. Therefore, an organic-containing material having a high content of crude protein can be added, thereby more activating sulfate-reducing bacteria. The upper limit of the content of crude protein in the organic-containing material is not limited in particular, and may be about 25 mass %.

Various kinds of bacteria in the biological purifier also decompose crude fat in the organic-containing material into organic components that can be used as respiratory substrates by sulfate-reducing bacteria. Therefore, the content of crude fat is also preferably high. In this embodiment, the content of crude fat in the organic-containing material is preferably 2 mass % or more. The upper limit of the content of crude fat in the organic-containing material is not limited in particular, and may be about 20 mass %.

Since crude fiber in the organic-containing material is a remnant component that is not decomposed by bacteria, so that the amount of crude fiber is preferably small. In this embodiment, crude fiber contained in the organic-containing material is preferably 50 mass % or less. The lower limit of crude fiber is not limited in particular, and may be about 5 mass %.

In this embodiment, examples of preferable organic-containing materials include sake lees, bean curd refuse, rice bran, tea leaves, Lotus, timothy, and clover. These materials can easily be obtained and can be used as they are without any treatment on the obtained materials.

Note that bacteria other than sulfate-reducing bacteria in a bacterial community involved in the sulfate ion-reducing activity are anaerobic bacteria that decompose the organic-containing material and part of the chaff to supply low-molecular-weight organic matter which can be used as respiratory substrates by sulfate-reducing bacteria. Most of anaerobic bacteria digest organic matter and excrete acetic acid. Acetic acid is one of organic acids which can be used by sulfate-reducing bacteria; accordingly, organic matter which can be absorbed by sulfate-reducing bacteria can be supplied without particularly specifying the kind of the anaerobic bacterial community. Thus, the kind is not limited, and for example, acetic acid bacteria, lactic acid bacteria, denitrifying bacteria, *Escherichia coli* bacteria, *Bacillus subtilis* bacteria, hydrogen-producing bacteria, and yeast which is a fungus, and the like can be used. Further, in actual tests, *Azospira* sp, *Clostridium* sp, *Dechloromonas* sp, *Hydrogenophaga* sp, *Simplicispira* sp, *Hydrogenophaga* sp, *Nitrospira* sp, *Spirochaeta* sp, and the like have been detected. These bacteria are attached to chaff or bacterial sources described below.

With a view to achieving the intended effect, preferably, chaff is left with untreated waste water under anaerobic conditions so that a bacterial community including sulfate-reducing bacteria, involved in the sulfate ion-reducing activity is acclimated, and the organic-containing material is added after the acclimation. This will be described below in more detail.

(Method of Producing Biological Purifier)

An example of a method of producing a biological purifier will now be described.

First, chaff retaining sulfate-reducing bacteria is left with untreated waste water under anaerobic conditions thereby acclimating a bacterial community including sulfate-reducing bacteria, which is involved in the sulfate ion-reducing activity. Here, the acclimation step preferably includes two steps of a pre-cultivation step of culturing the bacterial community including the sulfate-reducing bacteria, involved in the sulfate ion-reducing activity by leaving part of the chaff with bacterial sources and the untreated waste water under anaerobic conditions at a water temperature of 20° C. to 30° C.; and a subsequent cultivation step of further culturing the bacterial community including the sulfate-reducing bacteria, involved in the sulfate ion-reducing activity by leaving the pre-cultivated chaff with the rest of the chaff and the untreated waste water under anaerobic conditions at a water temperature of 10° C. to 15° C.

<Pre-Cultivation Step>

In the pre-cultivation step, the chaff is left with the bacterial sources and the untreated waste water under anaerobic conditions at a water temperature of 20° C. to 30° C. For example, a slight amount about 0.5 g to 1 g of bacterial sources such as bark compost and humus soil is added to 10 g to 20 g of chaff (5 mass % of the chaff to be added in a cultivation step), and the mixture is mixed into 100 mL to 200 mL of untreated waste water. This is left under anaerobic conditions at a water temperature of 20° C. to 30° C. for 7 to 14 days. The water temperatures of 20° C. to 30° C. are temperatures suitable for culturing a bacterial community including sulfate-reducing bacteria, involved in the sulfate ion-reducing activity, and this step allows the bacterial community to be cultured and activated.

<Cultivation Step>

In the cultivation step, chaff, limestone, and untreated waste water are added and then they are left under anaerobic conditions at a water temperature of 10° C. to 15° C. thereby further culturing the bacterial community including sulfate-reducing bacteria, involved in the sulfate ion-reducing activity. Specifically, first, 200 g to 400 g of chaff and 800 g to 1600 g of lime stone are additionally added to the chaff having been subjected to the pre-cultivation step, and the mixture is transferred into a column. After that, 2000 mL to 3000 mL of untreated waste water is added into the column. This is left under anaerobic conditions at a water temperature of 10° C. to 15° C. for 7 to 14 days. Thus, the bacterial community including sulfate-reducing bacteria, involved in the sulfate ion-reducing activity can be further cultured.

After the acclimation step, an organic-containing material containing 5 mass % or more of crude protein is added into the column to obtain the biological purifier of this disclosure.

A first feature of this embodiment with respect to the above steps lies in that the bacterial community including sulfate-reducing bacteria, involved in the sulfate ion-reducing activity is acclimated without the addition of the above organic-containing material. The inventors found that those organic-containing materials activate a bacterial community including sulfate-reducing bacteria, involved in the sulfate ion-reducing activity even at a water temperature of 15° C. or less in the step for continuously flowing the untreated waste water to promote the sulfate ion-reducing activity, and retard the development of the sulfate ion reducing activity in the acclimation step. This tendency is also observed in cases where the water temperature of untreated waste water in the acclimation is 15° C. or less and where the temperature is 20° C. to 30° C. Accordingly, these organic-containing materials are preferably added before continuously flowing the untreated waste water after the acclimation of the bacterial community including sulfate-reducing bacteria, involved in the sulfate ion-reducing activity. This makes it possible to obtain high sulfate ion-reducing activity due to the acclimation and to achieve sufficient effect in removing metal ions due to the subsequent continuous water flowing.

A second feature of this embodiment lies in that a pre-cultivation step is performed using part of chaff before the cultivation step in a low temperature environment. The cultivation step is efficiently performed in a column in which the untreated waste water is continuously flown. In this disclosure, since the water is supposed to be continuously flown in a low temperature environment of 15° C. or less, this cultivation step may be performed under a low temperature environment at a water temperature of 15° C. or less. However, according to the studies made by the inventors, in a low temperature environment, there are cases where the sulfate ion-reducing activity of the bacterial community including sulfate-reducing bacteria, involved in the sulfate ion-reducing activity cannot be obtained, and even if the activity is obtained, it takes long.

Accordingly, the inventors used a small amount of chaff to culture a bacterial community including sulfate-reducing bacteria, involved in the sulfate ion-reducing activity at a normal water temperature of 20° C. to 30° C., and mixed the chaff during the acclimation in a low temperature environment to find that the sulfate ion reducing activity can sufficiently be obtained in a short time.

Note that the two steps as described above are not required when all the chaff used as the biological purifier can be acclimated at a normal water temperature of 20° C. to 30° C.

The biological purifier of this embodiment preferably includes 73 mass % to 83 mass % of chaff, 12 mass % to 22 mass % of an additional organic-containing materials, and 0 mass % to 5 mass % of materials serving as bacterial sources, on the material base. When the proportion of the additional organic-containing material is 12 mass % or more, the intended effect can sufficiently be achieved. On the other hand, when the proportion of the organic-containing materials is 22 mass % or less, excessive organic contamination is not caused.

(Biological Purification Method/Biological Purification System)

Embodiments of the disclosed biological purification system and biological purification system will now be explained. FIG. 1 is a schematic view of a biological purification system 100 according to one embodiment. A column 10 that is a treatment container in a closed system stores the aforementioned biological purifier. FIG. 1 shows the column 10, in which the acclimation of sulfate-reducing bacteria is performed, and the state after the addition of the organic-containing material. Reference numeral 12 denotes a mixture of chaff and lime stone, and reference numeral 14 denotes a mixture of chaff, an organic-containing material added afterwards, and lime stone.

As described above, in the biological purification system of this embodiment, the chaff is distributed throughout the column 10, whereas the additional organic-containing material is distributed only in an upper part of the column 10. Since organic matter resulted from the decomposition of the organic-containing material in the upper part of the column 10 is supplied throughout the column 10 by the flow of the continuously flown untreated waste water, the whole sulfate-reducing bacteria in the column 10 can be activated.

When purifying acidic untreated waste water having a pH of about 3.5 to 5.0, lime stone is preferably added as a pH buffer.

A supply circuit 20 that continuously supplying untreated waste water into the column 10 includes an untreated waste water reservoir 22, a supply tube 24, and a diaphragm pump 26. The supply tube 24 connects the reservoir 22 and an upper part of the column 10. The diaphragm pump 26 is driven to supply the untreated waste water in the reservoir 22 into the column 10 via the upper inlet of the column through the supply tube 24.

In this embodiment, a discharge circuit is configured such that treated water is continuously discharged from the column 10 through an outlet tube 30. The outlet tube 30 is configured to be coupled with the outlet of the treatment container 10 such that the water is discharged at a height the same as the water level of the water in the column. Note that the column 10 is provided with five sampling ports 16A to 16E, thereby regularly sampling untreated waste water in the column.

In the biological purification method of this embodiment, while the column 10 storing the disclosed biological purifier is maintained under anaerobic conditions, untreated waste water is continuously flown into the biological purifier. As untreated waste water migrates from the upper part to the bottom part of the column, sulfides of metal ions in the untreated waste water are precipitated. Thus, the metal ions are removed from the untreated waste water.

The residence time of untreated waste water in the column, the amount of the biological purifier with respect to the amount of the untreated waste water, and the like can be determined as appropriate depending on the concentration of metal ions contained in the untreated waste water, the target concentration of metal ions, and the like.

With such a simple method and system, metal ions in untreated waste water containing metal ions and sulfate ions can be removed in a low temperature environment with a water temperature of 15° C. or less for a long period of time.

EXAMPLES

In order to further clarify the effects, experiments were performed in accordance with the following examples and comparative examples.

Experimental Example 1

A test apparatus as shown in FIG. 1 was assembled using a cylindrical vinyl chloride column having a diameter of 10 cm and a height of 40 cm. Five sampling ports are hereinafter referred to as first, second, third, fourth, fifth stages in this order from the top. The column was loaded with the following mixture. Note that silica is a structural material for securing voids in the column. Rice husks were obtained, which had been threshed by a coin-operated rice mill and preserved in a dry state, and were used as they were without performing any process such as grinding on them. Sulfate-reducing bacteria were attached to the rice husks.

Rice husks: 330 g
Bacterial sources: 17 g (pre-cultivated rice husks)
Lime stone: 300 g
Silica: 730 g
Mine drainage (pH: 3.3 to 3.8, $SO_4^{2-}$: 350 mg/L to 400 mg/L, Zn: 15 mg/L to 18 mg/L, Cu: 3 mg/L to 10 mg/L) was used as untreated waste water. Untreated waste water of 3000 mL was added into the column and was left under anaerobic conditions at a water temperature of 15° C. for 14 days, thereby acclimating a bacterial community including sulfate-reducing bacteria, which is involved in the sulfate ion-reducing activity. Note that the same untreated waste water was used in every experimental example below.

After the acclimation, the untreated waste water was pumped up to flow from the top of the column to the bottom thereof. The flow volume was 60 mL/h and the time of residence in the column was 50 hours. The treated water flowed through a silicon tube attached to the bottom of the column and was discharged at a height the same as the water level of the water in the column. Two different experiments were carried out with the water temperature of the untreated waste water being 25° C. and 15° C.

<Evaluation of Sulfate Ion Reducing Characteristics>

In each experiment, untreated waste water was regularly sampled from the five sampling ports and the ORPs (mV) were measured using an ORP meter (RM-20P, manufactured by DKK-TOA). Lower ORP indicates that the untreated waste water is under anaerobic conditions, which allows sulfate-reducing bacteria to work actively. The case where the water temperature was 25° C. is shown in FIG. 2, and the case where the water temperature was 15° C. is shown in FIG. 3.

Figure 2:
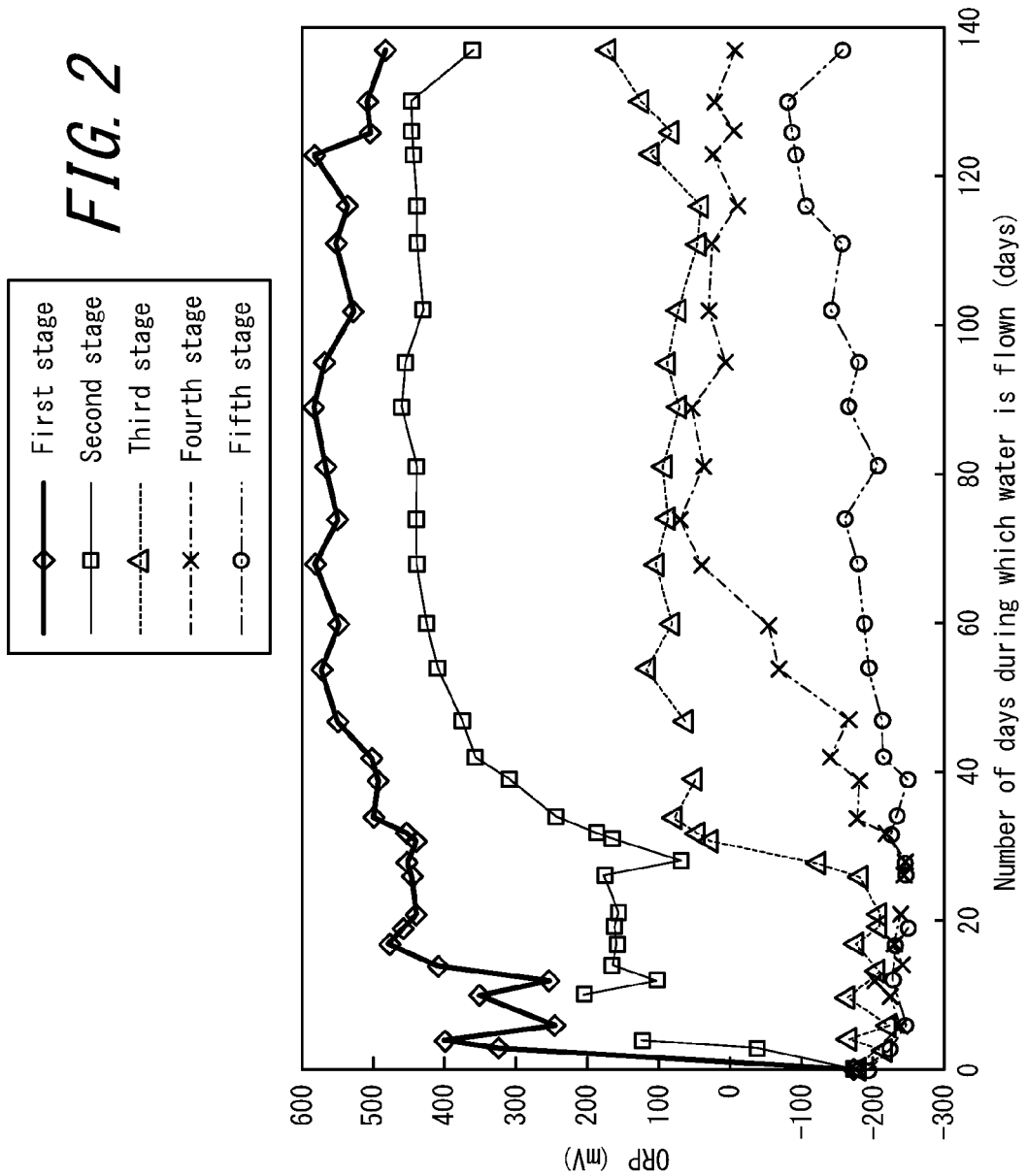
FIG. 2 is a graph showing the change in the ORP with time in a column test performed at a water temperature of 25° C. with the use of a biological purifier using rice husks (Comparative Example 1)
Figure 3:
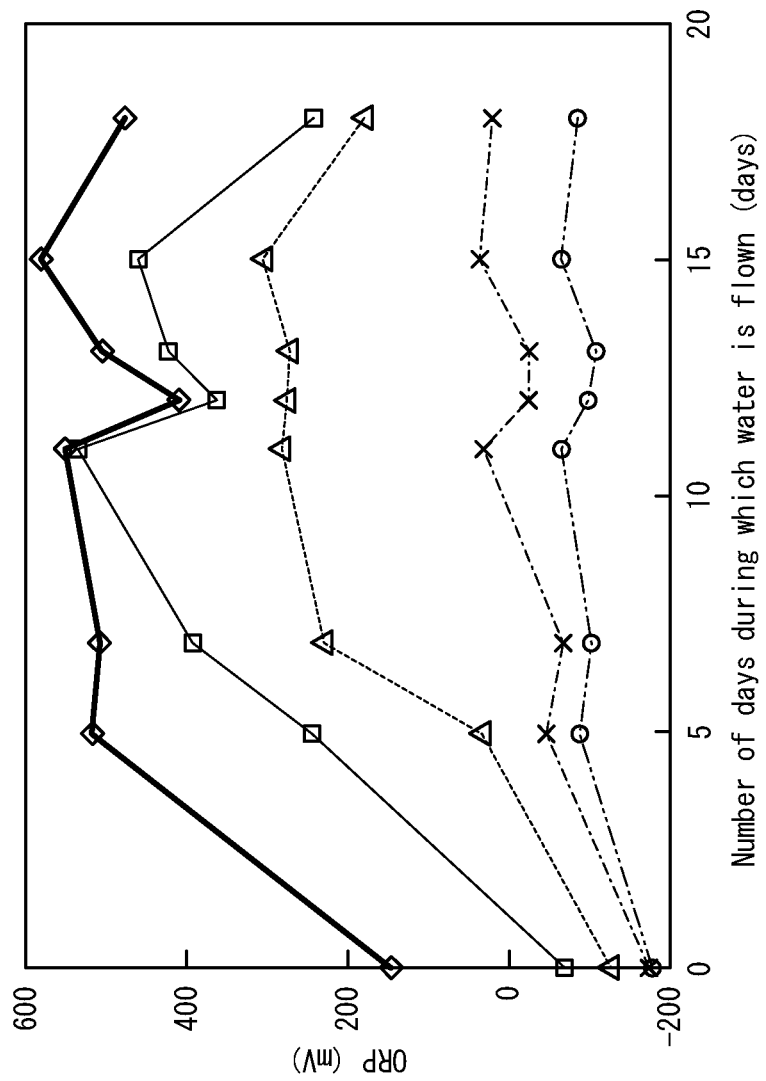
FIG. 3 is a graph showing the change in the ORP with time in a column test performed at a water temperature of 15° C. with the use of a biological purifier using rice husks (Comparative Example 1)

As shown in FIG. 2, when the water temperature was 25° C., the first and second stages in the column turned into oxidative environments immediately after the water flow was initiated, whereas the third stage maintained a reducing environment up to 30 days after and the fourth stage, 60 days after. On the other hand, as shown in FIG. 3, when the water temperature was 15° C., the first to fourth stages turned into oxidative environments from 10 days after the initiation of water flow. Further, the fifth stage is shown to exceed −100 mV and early have failed to maintain the reducing environment.

<Measurement of Metal Ion Concentration>

The Zn ion concentration of the treated water was regularly measured. The effluent standard with respect to Zn ions, prescribed in the Water Pollution Control Act (Act No. 105 of Aug. 30, 2011) and the Ordinance for Effluent Standards (Ordinance of the Ministry of the Environment No. 28 of Oct. 28, 2011) is 2 mg/L. At a water temperature of 25° C., the effluent standard was consistently met for 100 days or more from the initiation of water flow. However, at a water temperature of 15° C., 5.7 mg/L of Zn ions that greatly exceeds the effluent standard after 13 days from the initiation of water flow.

Experimental Example 2

Example 1

For a pre-cultivation step, 17 g of rice husks, 0.9 g of bark compost as bacterial sources, and 200 mL of untreated waste water were put into a small container, and left under anaerobic conditions at a water temperature of 25° C. for 14 days. Subsequently 260 g of rice husks and 1050 g of lime stone were additionally added to the pre-cultivated rice husks, and the mixture was removed to the same column as Experimental Example 1. After that, 3000 mL of untreated waste water was added into the column and they were left under anaerobic conditions at a water temperature of 15° C. for 14 days for a cultivation step. Rice husks were obtained, which had been threshed by a coin-operated rice mill and preserved in a dry state, and were used as they were without performing any process such as grinding on them. Sulfate-reducing bacteria were attached to the rice husks.

A mixture of 100 g of sake lees, 90 g of rice husks, and 350 g of lime stone was then added to the upper part of the column. For the sake lees, commercially available wet sake lees was used as it was without drying it.

Figure 4:
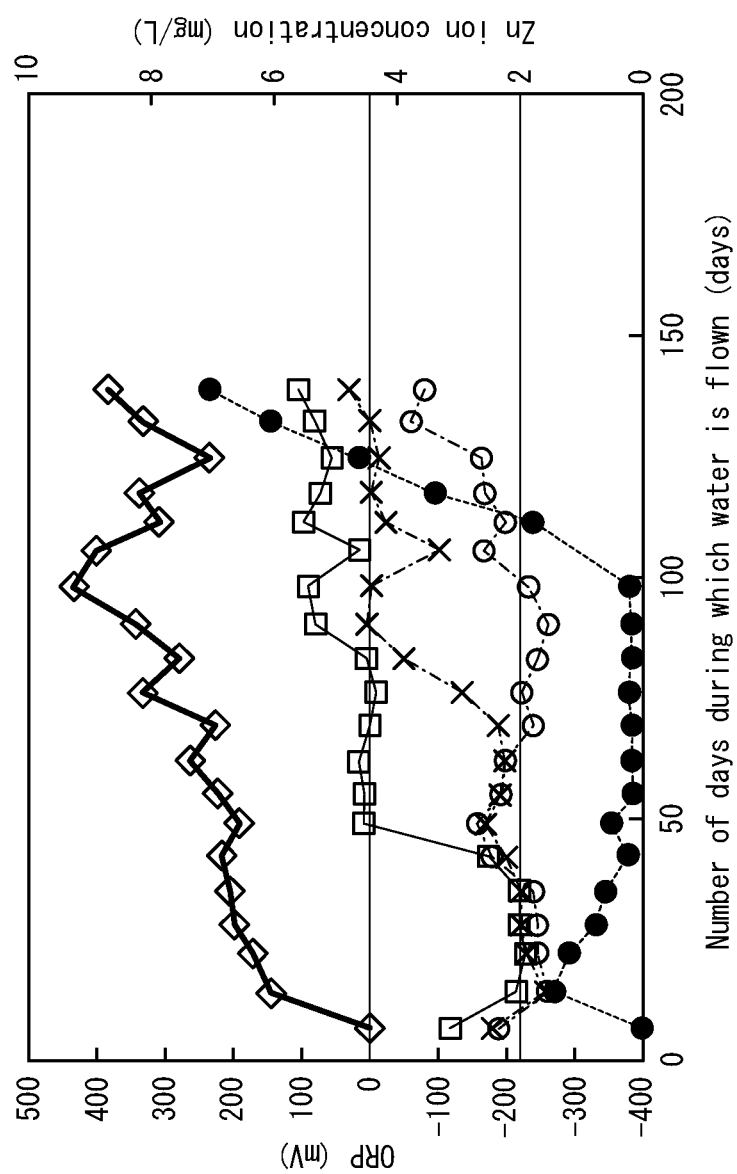
FIG. 4 is a graph showing the change in the ORP with time and the change in the Zn ion concentration in the treated water discharged from a column with time in a column test performed at a water temperature of 15° C. with the use of a biological purifier using rice husks and sake lees (Example 1)

After that, as with the case where the water temperature was 15° C. in Experimental Example 1, the step for continuously flowing untreated waste water was performed and the measurement of ORP and the measurement of the Zn ion concentration of the treated water were performed as in Experimental Example 1. FIG. 4 shows the measurement results.

Example 2

Figure 5:
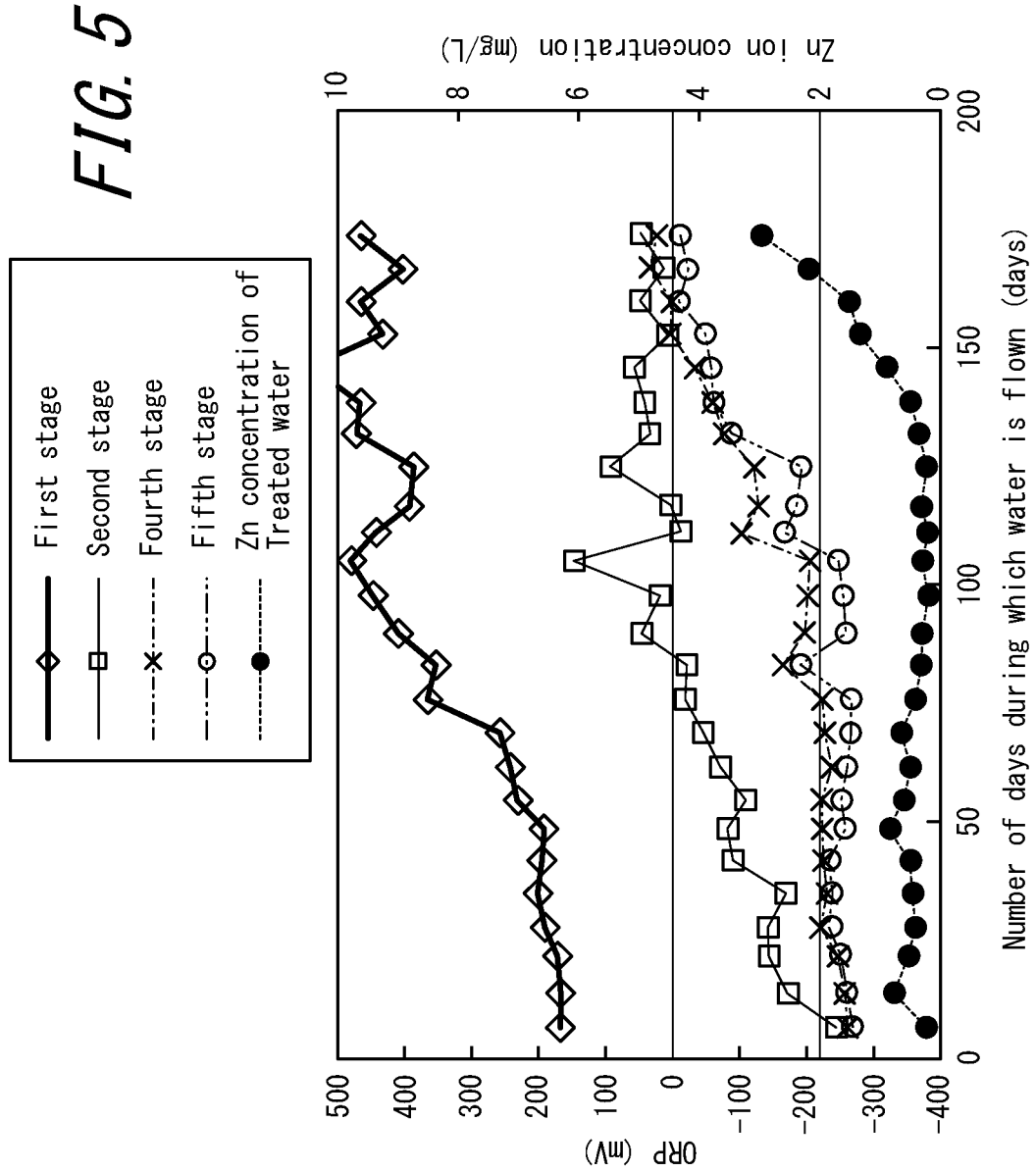
FIG. 5 is a graph showing the change in the ORP with time and the change in the Zn ion concentration in the treated water discharged from a column with time in a column test performed at a water temperature of 15° C. with the use of a biological purifier using rice husks and bean curd refuse (Example 2)

An experiment was performed in the same manner as Example 1 except that 100 g of bean curd refuse was used instead of 100 g of sake lees. For the bean curd refuse, commercially available wet bean curd refuse (soy pulp) was used as it was without drying it. FIG. 5 shows the measurement results.

Example 3

Figure 6:
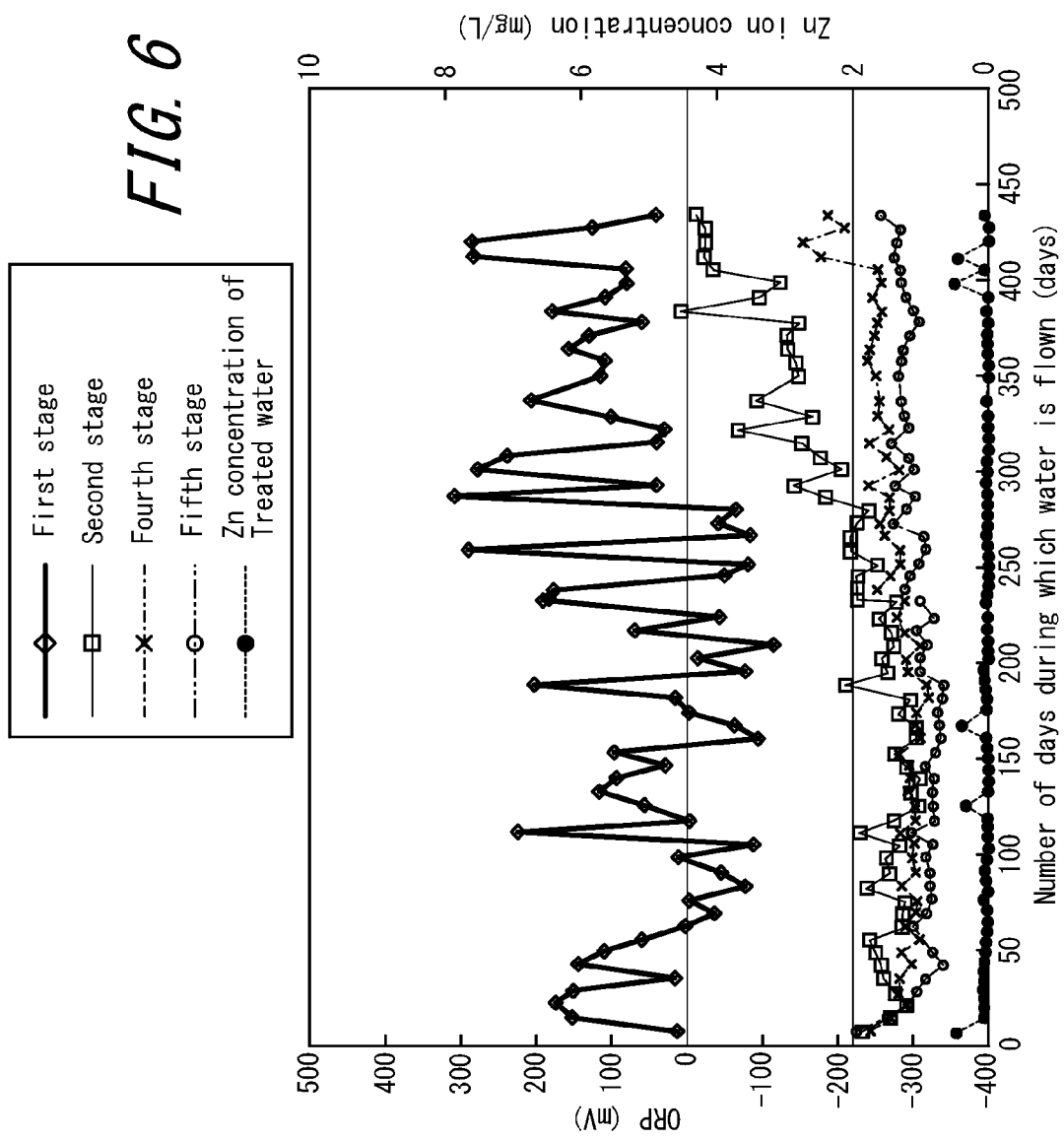
FIG. 6 is a graph showing the change in the ORP with time and the change in the Zn ion concentration in the treated water discharged from a column with time in a column test performed at a water temperature of 15° C. with the use of a biological purifier using rice husks and rice bran (Example 3)

An experiment was performed in the same manner as Example 1 except that 100 g of rice bran was used instead of 100 g of sake lees. For rice bran, powdered rice bran having been discharged from a coin-operated rice mill and stored in a dry state was obtained, and was used as it was without performing any process on it. FIG. 6 shows the measurement results.

Example 4

Figure 7:
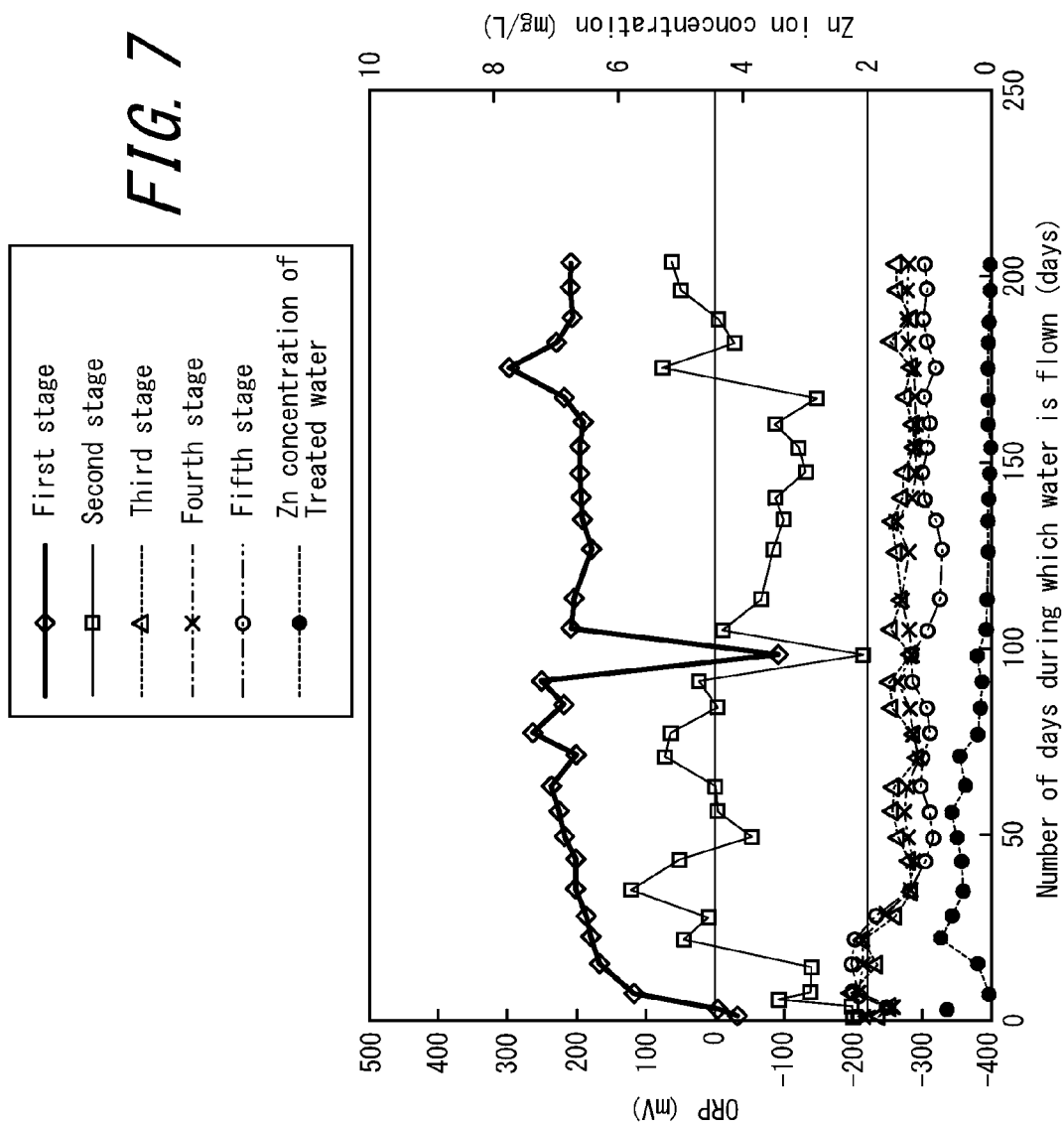
FIG. 7 is a graph showing the change in the ORP with time and the change in the Zn ion concentration in the treated water discharged from a column with time in a column test performed at a water temperature of 15° C. with the use of a biological purifier using rice husks and tea leaves (Example 4)

An experiment was performed in the same manner as Example 1 except that 100 g of tea leaves were used instead of 100 g of sake lees. For the tea leaves, commercially available tea leaves of green tea were used as they are in a dry state without performing any process on it. FIG. 7 shows the measurement results. Note that equivalent results can be obtained when tea leaves of oolong tea or black tea are used. Further, equivalent results can be obtained when used tea leaves are sued for the tea leaves.

Example 5

Figure 8:
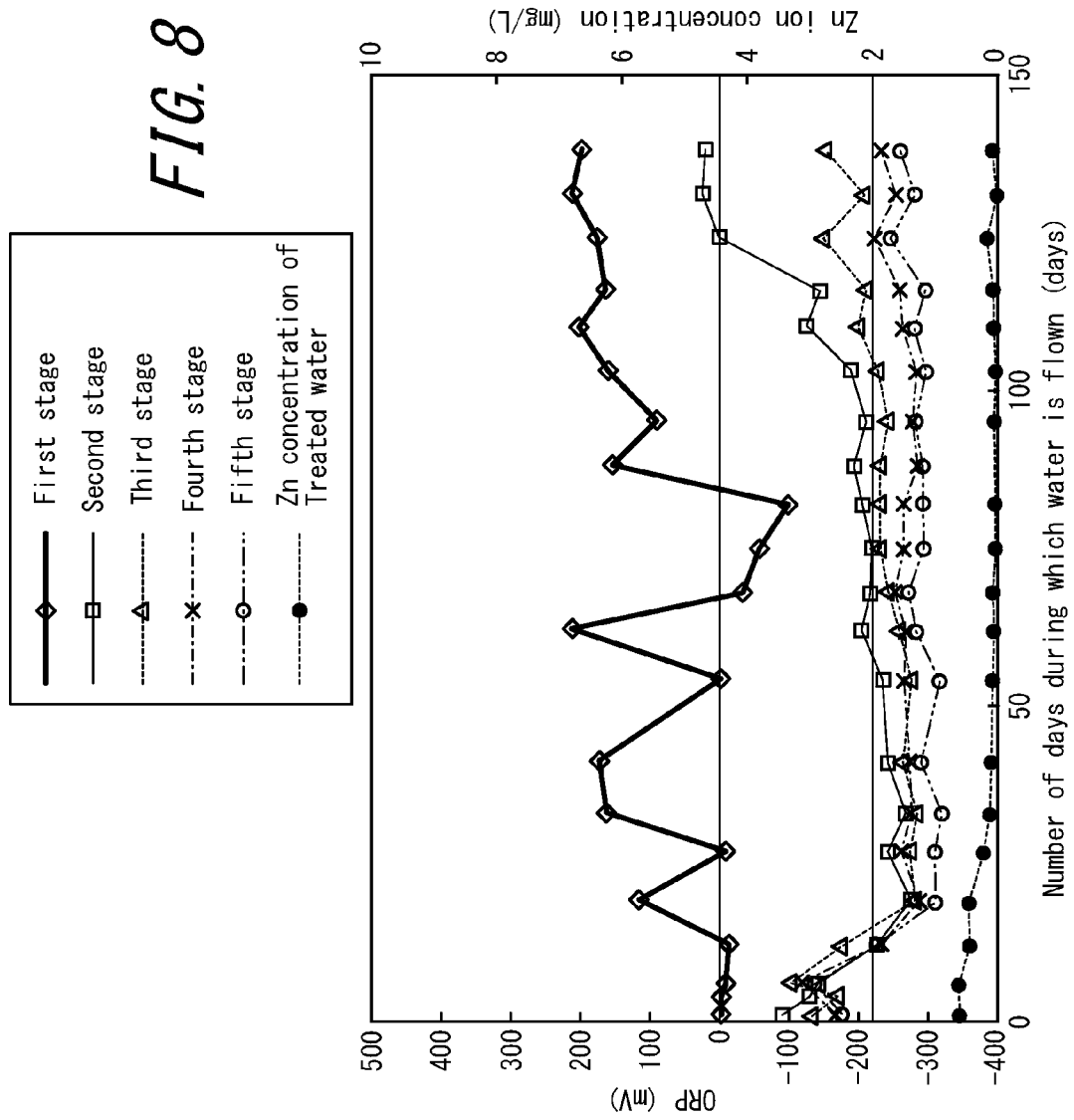
FIG. 8 is a graph showing the change in the ORP with time and the change in the Zn ion concentration in the treated water discharged from a column with time in a column test performed at a water temperature of 15° C. with the use of a biological purifier using rice husks and Lotus (Example 5)

An experiment was performed in the same manner as Example 1 except that 100 g of *Lotus* was used instead of 100 g of sake lees. For the *Lotus*, *Lotus* (*Lotus corniculatus*) grass growing naturally around the laboratory was mowed and let dry naturally for several days to be used. FIG. 8 shows the measurement results.

Example 6

Figure 9:
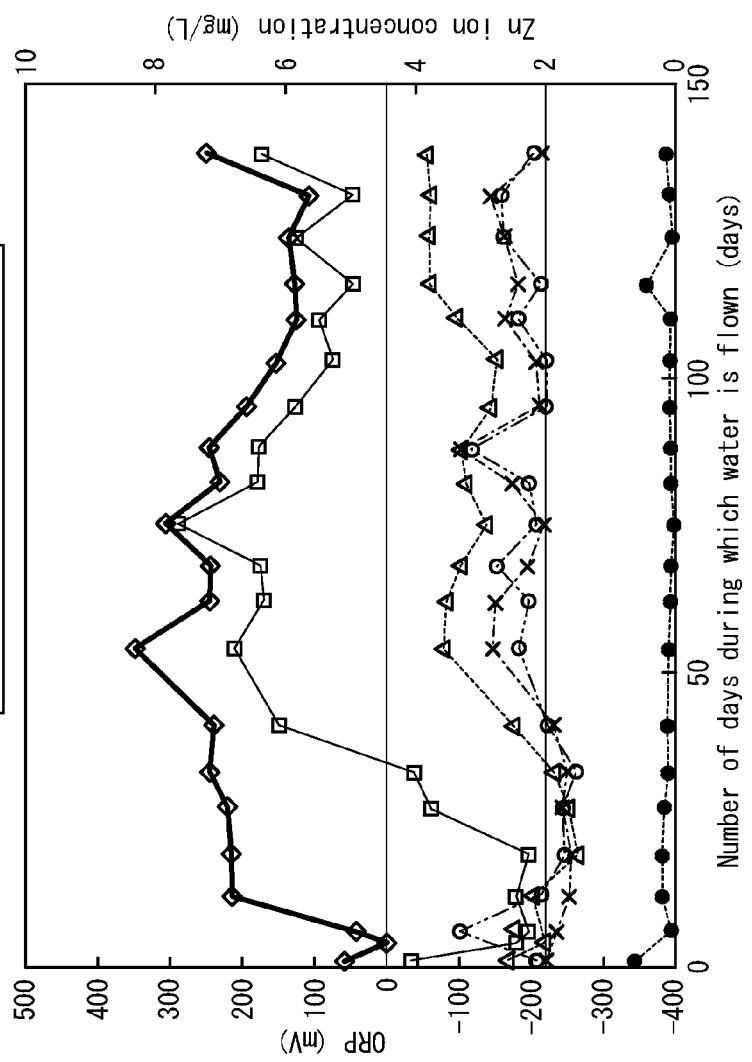
FIG. 9 is a graph showing the change in the ORP with time and the change in the Zn ion concentration in the treated water discharged from a column with time in a column test performed at a water temperature of 15° C. with the use of a biological purifier using rice husks and timothy (Example 6)

An experiment was performed in the same manner as Example 1 except that 100 g of timothy was used instead of 100 g of sake lees. For the timothy, timothy used as pasture in a dry state was used without performing any process on it. FIG. 9 shows the measurement results.

Example 7

Figure 10:
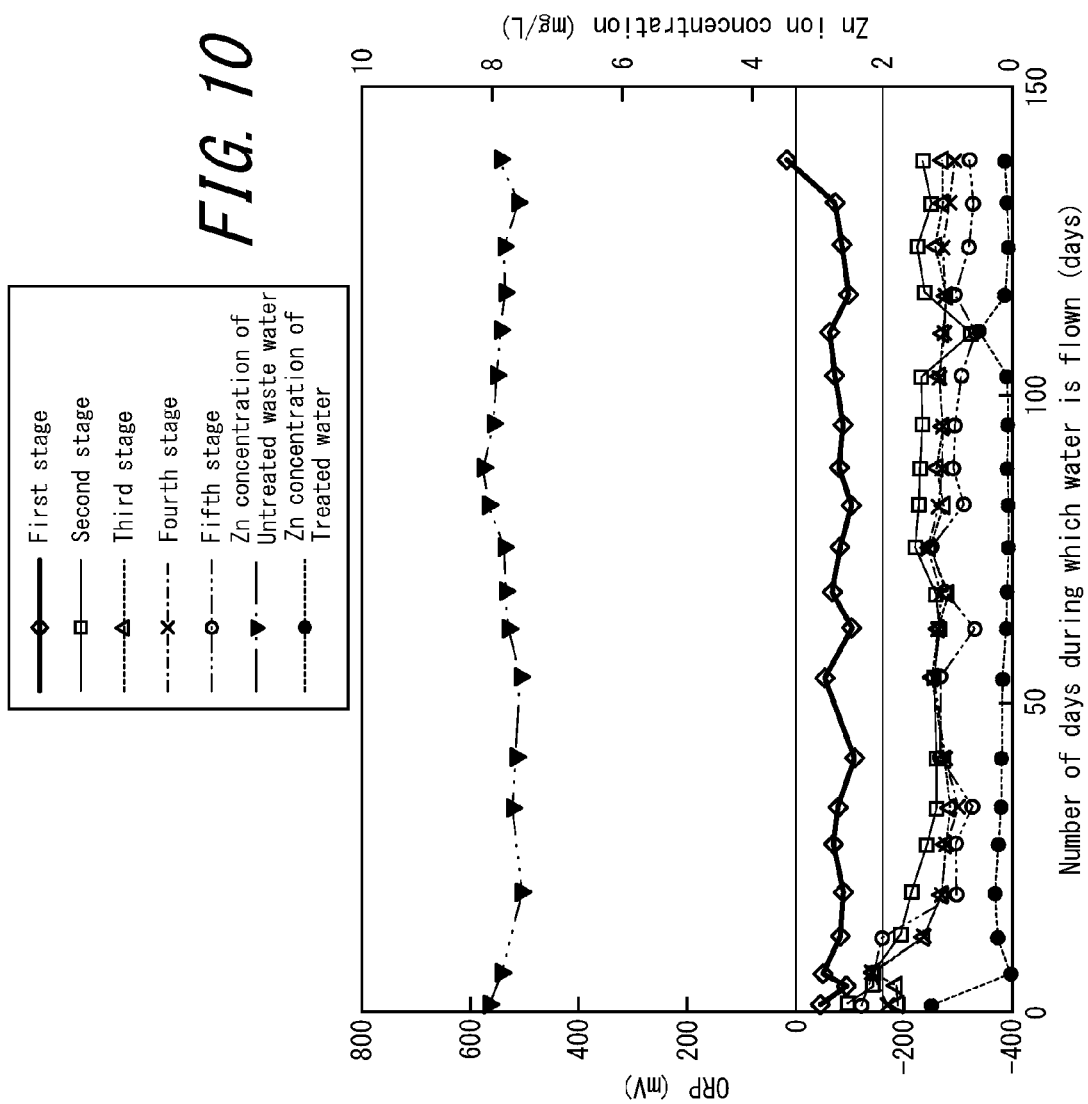
FIG. 10 is a graph showing the change in the ORP with time and the change in the Zn ion concentration in the treated water discharged from a column with time in a column test performed at a water temperature of 15° C. with the use of a biological purifier using rice husks and clover (Example 7)

An experiment was performed in the same manner as Example 1 except that 100 g of clover was used instead of 100 g of sake lees. For the clover, white clover (*Trifolium repens*) grass growing naturally around the laboratory was mowed and let dry naturally for several days to be used. FIG. 10 shows the measurement results.

Comparative Example 1

Figure 11:
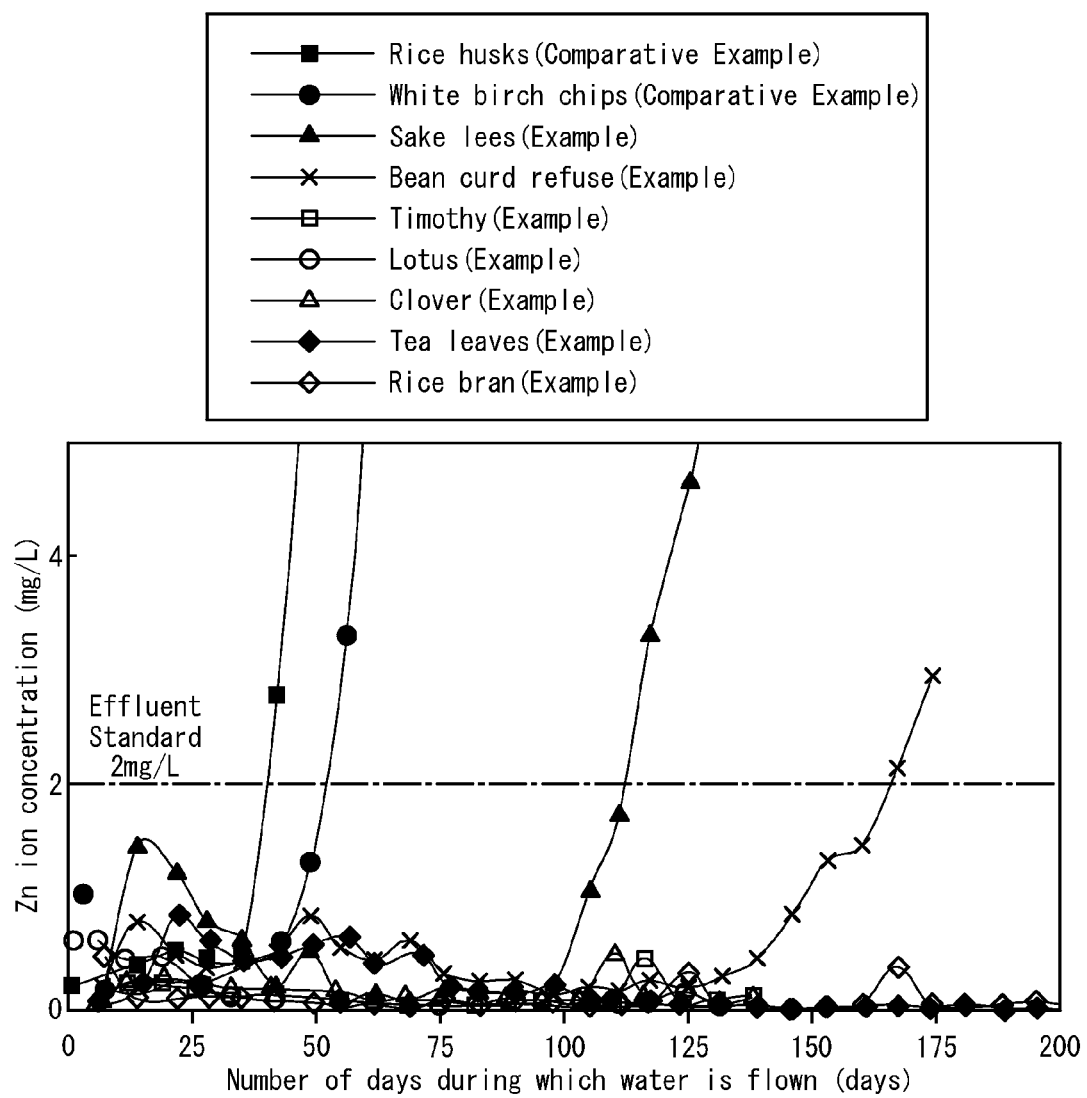
FIG. 11 is a graph showing the change in the Zn ion concentration in the treated water discharged from a column with time in a column test performed at a water temperature of 15° C. with the use of a biological purifier using rice husks and a variety of organic-containing materials.

An experiment was performed in the same manner as Example 1 except that 100 g of rice husks were used instead of 100 g of sake lees. The change in the Zn ion concentration of the treated water with time is shown in FIG. 11 with the cases of other examples.

Comparative Example 2

An experiment was performed in the same manner as Example 1 except that 100 g of white birch chips were used instead of 100 g of sake lees. For the white birch chips, dried chipped white birch was used as it was without performing any process on it. The change in the Zn ion concentration of the treated water with time is shown in FIG. 11 with the cases of other examples.

DISCUSSION

First, the contents of crude protein, crude fat, crude fiber, and water in the additional organic-containing materials used in Examples 1 to 7 and Comparative Examples 1 and 2 were measured, and the results are shown in Table 1. Note that Table 1 also shows the number of days during which the Zn ion concentration of the treated water met the effluent standard based on FIG. 11.

TABLE 1

|  | Organic-containing material | Crude protein (mass %) | Crude fat (mass %) | Crude fiber (mass %) | Number of days during which the effluent standards are met |
|---|---|---|---|---|---|
| Example 1 | Sake lees | 14.9 | 1.5 | 5.2 | 110 |
| Example 2 | Bean curd refuse | 6.1 | 3.6 | 11.5 | 160 |
| Example 3 | Rice bran | 14.1 | 19.7 | 6.4 | ≥430 |
| Example 4 | Tea leaves | 24.5 | 4.7 | 46.5 | ≥200 |
| Example 5 | Lotus | 19.6 | 5.0 | 24.6 | ≥140 |
| Example 6 | Timothy | 10.3 | 2.1 | 38.1 | ≥140 |
| Example 7 | Clover | 24.2 | 4.7 | 16.1 | ≥140 |
| Comparative Example 1 | Rice husks | 1.72 | 0.87 | 31.3 | 35 |
| Comparative Example 2 | White birch chips | 0.8 | 1.2 | 51.8 | 50 |
| Comparative Example (Experimental Example 1) | None | — | — | — | <13 |

As shown in FIG. 4, when sake lees was used as an organic-containing material in addition to rice husks, the Zn ion concentration was under the effluent standard for 110 days from the initiation of water flow. As shown by the ORPs, a sufficient reducing state (−100 mV or less) was maintained for about 80 days in the fourth stage and for about 120 days in the fifth stage. As shown in FIG. 5, when bean curd refuse was used as an organic-containing material, the Zn ion concentration was under the effluent standard for even 160 days from the initiation of water flow, and an ORP of −100 mV or less was maintained for about 130 days in the fourth stage and the fifth stage. Further, as shown in FIG. 6, when rice bran was used as an organic-containing material, few Zn ions were detected even after the lapse of 430 days from the initiation of water flow. As shown by the ORPs, a sufficient reducing state of −100 mV or less was maintained for 430 days in the fourth stage and the fifth stage.

As shown in FIGS. 7 to 10, also when tea leaves, *Lotus*, timothy, or clover was used as an organic-containing material, the Zn ion concentration was consistently under the effluent standard during the water flow period, and the ORPs were maintained at 100 mV or less, resulting in a sufficient reducing state, at least in the fourth stage and the fifth stage.

However, as shown in FIG. 11, when rice husks and white birch chips were used as organic-containing materials, the Zn ion concentration satisfied the effluent standard only for 35 days and 50 days, respectively.

When no organic-containing material was added, the Zn ion concentration greatly exceeded the effluent standard only after 13 days from the initiation of water flow. On the other hand, when certain organic-containing materials containing as much as 5% or more of crude protein was added, the number of days during which the Zn ion concentration is under the effluent standard was significantly longer. Thus, there was large difference in the effects. As described above, according to this example, in a low temperature environment with a water temperature of 15° C., metal ions in the untreated waste water were successfully removed for a long period of time. When rice bran was used, particularly high effect was achieved.

Experimental Example 3

Figure 12:
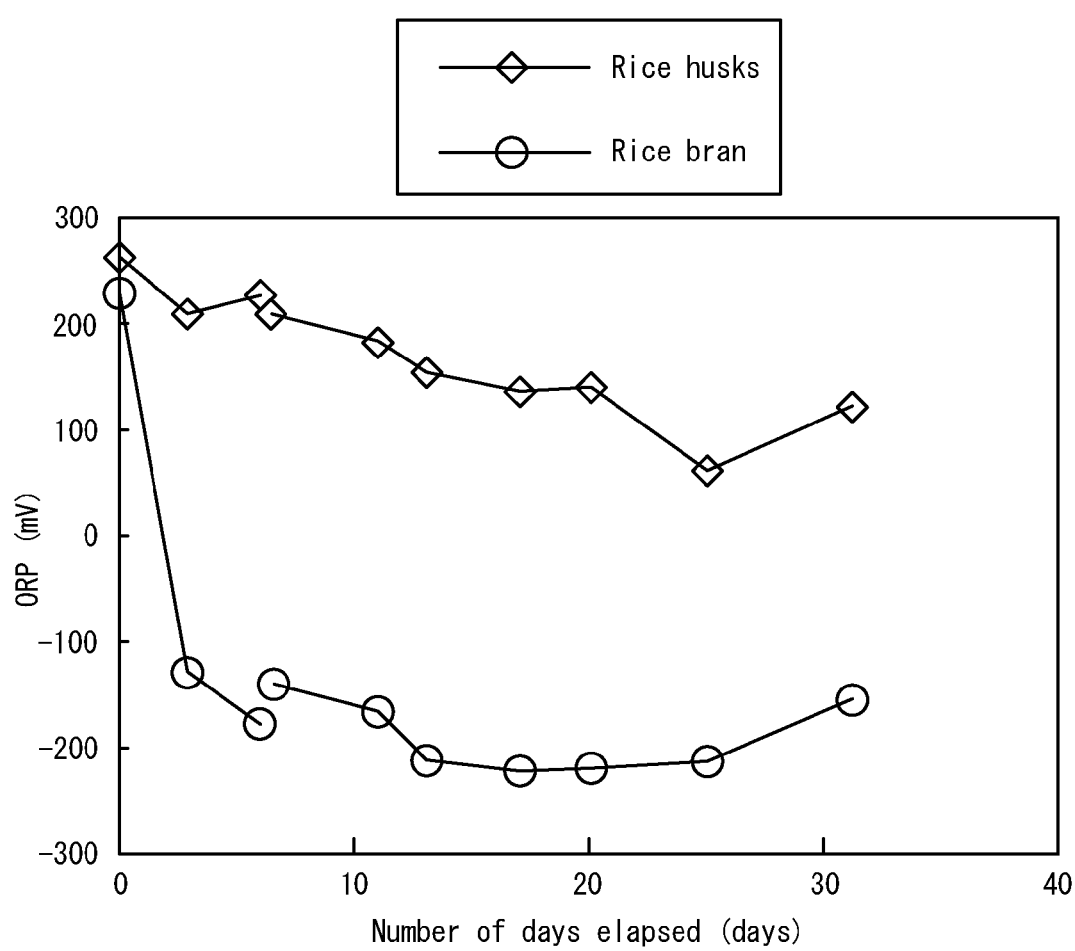
FIG. 12 is a graph showing the change in the ORP with time in a batch test performed at a water temperature of 4° C. with the use of biological purifiers of Comparative Example 1 and Example 1.

Next, an experiment was performed on the sulfate ion-reducing activity in a low temperature environment with a water temperature of 4° C. Specifically, 17 g of rice husks, 0.9 g of humus soil as bacterial sources, and 200 mL of untreated waste water were put into a small container, and left under anaerobic conditions at a water temperature of 25° C. for 14 days. After sulfate ion reduction was observed, the untreated waste water in the small container was discharged and 250 mL of new untreated waste water was added to be left at 4° C. Concurrently, the ORP was measured. After it was ensured that sulfate ion reduction would not occur, 1 g of rice bran was added to be left at 4° C., and the ORP was then measured. FIG. 12 shows the measurement results.

As shown in FIG. 12, when rice husks were used in a lower temperature environment with a water temperature of 4° C., an oxidative state was consistently maintained immediately after the experiment was started and a reducing state could not be obtained. On the other hand, when rice bran was added to rice husks, even in an environment with a water temperature of 4° C., −100 mV was maintained for 30 days or more and high sulfate ion-reducing activity was obtained for a long period of time.

Experimental Example 4

An experiment was performed to compare the sulfate ion-reducing activity in the acclimation step in the two-step cultivation between the cases where rice bran was added and where not. Specifically, for a pre-cultivation step, 17 g of rice husks, 0.9 g of humus soil as bacterial sources, and 200 mL of untreated waste water were put into a small container, and left under anaerobic conditions at a water temperature of 25° C. for 14 days. Subsequently, 350 g of rice husks and 1400 g of lime stone were additionally added to the pre-cultivated rice husks, and the mixture was removed to the same column as Experimental Example 1. After that, 3000 mL of untreated waste water was added into the column and they were left at a water temperature of 15° C. for a cultivation step. Here, the cases where 100 g of rice bran was added and where not are compared. The results of the measurement of the ORP and the measurement of the sulfate ion concentration are shown in FIGS. 13(A) and 13(B).

When rice bran was added in the acclimation, the reducing environment was unstable as shown in FIG. 13(A) and the reduction of the sulfate ion concentration was retarded as shown in FIG. 13(B). This s demonstrates that while rice bran promotes the sulfate ion-reducing activity in a continuous water flow test in a low temperature environment, it retards the development of the sulfate ion-reducing activity in the acclimation step.

Experimental Example 5

A column test was performed with the use of a biological purifier using rice husks and rice bran (Example 3) using a large column under ambient temperature conditions.

A test apparatus as shown in FIG. 1 was assembled using a cylindrical vinyl chloride column having a diameter of 25 cm and a height of 110 cm. The column was loaded with a mixture of 4.275 kg of rice husks, 17.5 g of surface soil sampled in the vicinity of the site, as bacterial sources, and 18 kg of lime stone. Untreated waste water of 35 L was added to the mixture to be left under anaerobic conditions at a water temperature of 15° C. to 25° C. for 10 days. After 10 days, the ORP was −200 mV to −300 mV and a reducing environment had been established, in which sulfate-reducing bacteria were activated.

A mixture of 1.5 kg of rice bran and 0.225 kg of rice husks was then added to the upper part of the column.

The untreated waste water was pumped up to pass from the top of the column to the bottom thereof for a residence time of 50 hours. Note that the temperature of the untreated waste water was not controlled and the environment in which the column was placed was an ambient temperature environment.

Figure 14:
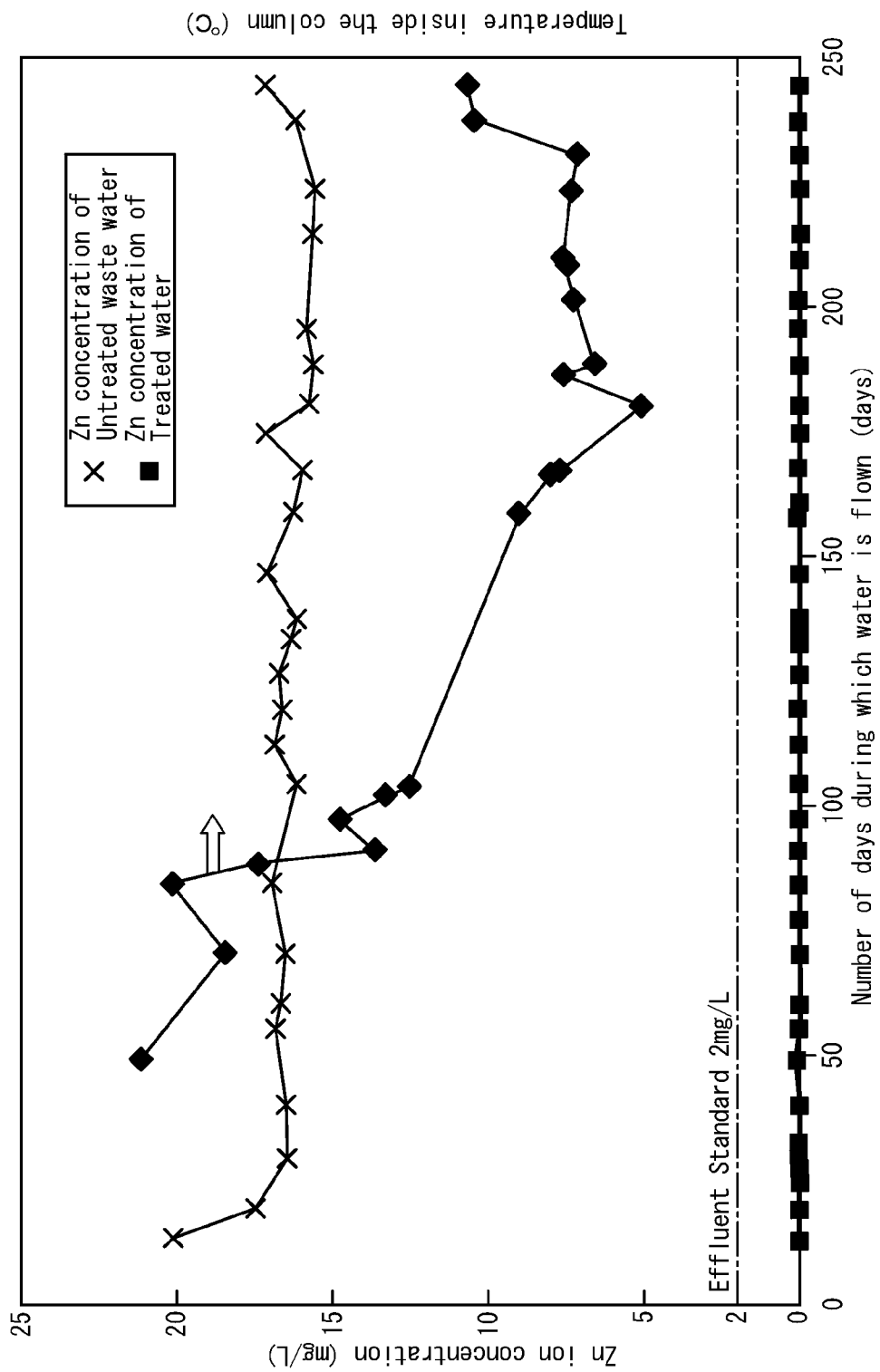
FIG. 14 is a graph showing the change in the ORP with time and the change in the Zn ion concentration in the treated water discharged from a column with time in a column test performed using a large column under ambient temperature conditions with the use of a biological purifier using rice husks and rice bran (Example 3).

FIG. 14 shows the change in the temperature inside the column with time and the change in the Zn ion concentration of the treated water discharged from the column with time. Table 2 shows the pH and the components of the untreated waste water and the treated water after 244 days of water flow.

TABLE 2

| | | | | Component (mg/L) | | | | |
|---|---|---|---|---|---|---|---|---|
| | pH | Zn | Fe | Cu | Cd | Al | Mn | $SO_4^{2-}$ |
| Untreated waste water | 3.43 | 17.215 | 37.225 | 8.035 | 0.082 | 10.27 | 2.198 | 335.3 |
| Treated water | 7.09 | 0.009 | 1.464 | 0.017 | 0.001 | 0.214 | 0.209 | 212.9 |

As shown in FIG. 14, the temperature inside the column dropped to 5° C. at the lowest during the test period. However, the Zn ion concentration was consistently under the effluent standard during the water flow period. As shown in FIG. 2, metal ions other than Zn ions were also sufficiently removed.

INDUSTRIAL APPLICABILITY

Thus, metal ions in untreated waste water containing metal ions and sulfate ions can be removed in a low temperature environment with a water temperature of 15° C. or less for a long period of time. Accordingly, the disclosed purifier, method, and system are suitable for treating mine drainage from mines from which low-temperature mine drainage is discharged in winter.

REFERENCE SIGNS LIST

100: Biological purification system
10: Column (Treatment container)
12: Chaff and lime stone
14: Chaff, additional organic-containing material, and lime stone
16A-16E: Sampling ports
20: Supply circuit
22: Untreated waste water reservoir
24: Supply tube
26: Diaphragm pump
30: Outlet tube (Discharge circuit)

The invention claimed is:

1. A biological purifier for untreated waste water containing metal ions and sulfate ions, the biological purifier comprising:
chaff retaining sulfate-reducing bacteria;
an organic-containing material containing 5 mass % or more of crude protein, that is made of at least one selected from sake lees, bean curd refuse, rice bran, tea leaves, Lotus, timothy, and clover;
a bacteria source having a bacterial community involved in the sulfate ion-reducing activity; and
lime stone,
wherein the chaff, the bacteria source, and the lime stone are left with the untreated waste water under anaerobic conditions so that the bacterial community including the sulfate-reducing bacteria is acclimated, and the organic-containing material is added after the acclimation.

2. The biological purifier according to claim 1, wherein the organic-containing material contains 50 mass % or less of crude fiber.

3. The biological purifier according to claim 1, wherein the organic-containing material is made of at least one selected from sake lees, rice bran, tea leaves, Lotus, timothy, and clover.

4. The biological purifier according to claim 1, wherein the bacteria source is at least one selected from bark compost, humus soil, and pre-cultivated rice husks.

5. A biological purification method for untreated waste water containing metal ions and sulfate ions, the method comprising the steps of:
providing a biological purifier comprising chaff retaining sulfate-reducing bacteria, an organic-containing material containing 5 mass % or more of crude protein, that is made of at least one selected from sake lees, bean curd refuse, rice bran, tea leaves, Lotus, timothy, and clover, a bacteria source having a bacterial community involved in the sulfate ion-reducing activity, and lime stone;
acclimating the bacterial community including the sulfate-reducing bacteria by leaving the chaff, the bacteria source, and the lime stone with the untreated waste water under anaerobic conditions;
after the acclimation step, adding the organic-containing material;
after the addition step, continuously flowing the untreated waste water through the biological purifier under anaerobic conditions; and
thereby removing the metal ions from the untreated waste water by precipitating sulfides of the metal ions.

6. The biological purification method according to claim 5, wherein the acclimation step comprises:
a pre-cultivation step of culturing the bacterial community including the sulfate-reducing bacteria by leaving part of the chaff with the bacteria source and the untreated waste water under anaerobic conditions at a water temperature of 20° C. to 30° C.; and
a subsequent cultivation step of further culturing the bacterial community including the sulfate-reducing bacteria by leaving the pre-cultivated chaff with the rest of the chaff, the lime stone, and the untreated waste water under anaerobic conditions at a water temperature of 10° C. to 15° C.

7. A method of producing a biological purifier for untreated waste water containing metal ions and sulfate ions, the method comprising the steps of:

acclimating a bacterial community including sulfate-reducing bacteria, involved in the sulfate ion-reducing activity by leaving chaff retaining the sulfate-reducing bacteria, a bacteria source having the bacterial community, and lime stone with the untreated waste water under anaerobic conditions; and then adding an organic-containing material containing 5 mass % or more of crude protein, that is made of at least one selected from sake lees, bean curd refuse, rice bran, tea leaves, *Lotus*, timothy, and clover to obtain the biological purifier.

8. The method according to claim 7, wherein the acclimation step comprises:

a pre-cultivation step of culturing the bacterial community including the sulfate-reducing bacteria by leaving part of the chaff with the bacteria source and the untreated waste water under anaerobic conditions at a water temperature of 20° C. to 30° C.; and a subsequent cultivation step of further culturing the bacterial community including the sulfate-reducing bacteria by leaving the pre-cultivated chaff with the rest of the chaff, the lime stone, and the untreated waste water under anaerobic conditions at a water temperature of 10° C. to 15° C.

9. The method according to claim 7, wherein the organic-containing material contains 50 mass % or less of crude fiber.

\* \* \* \* \*